Oct. 31, 1961     H. B. CARR ET AL     3,006,598
BUTTERFLY VALVE
Filed July 8, 1958     2 Sheets-Sheet 1
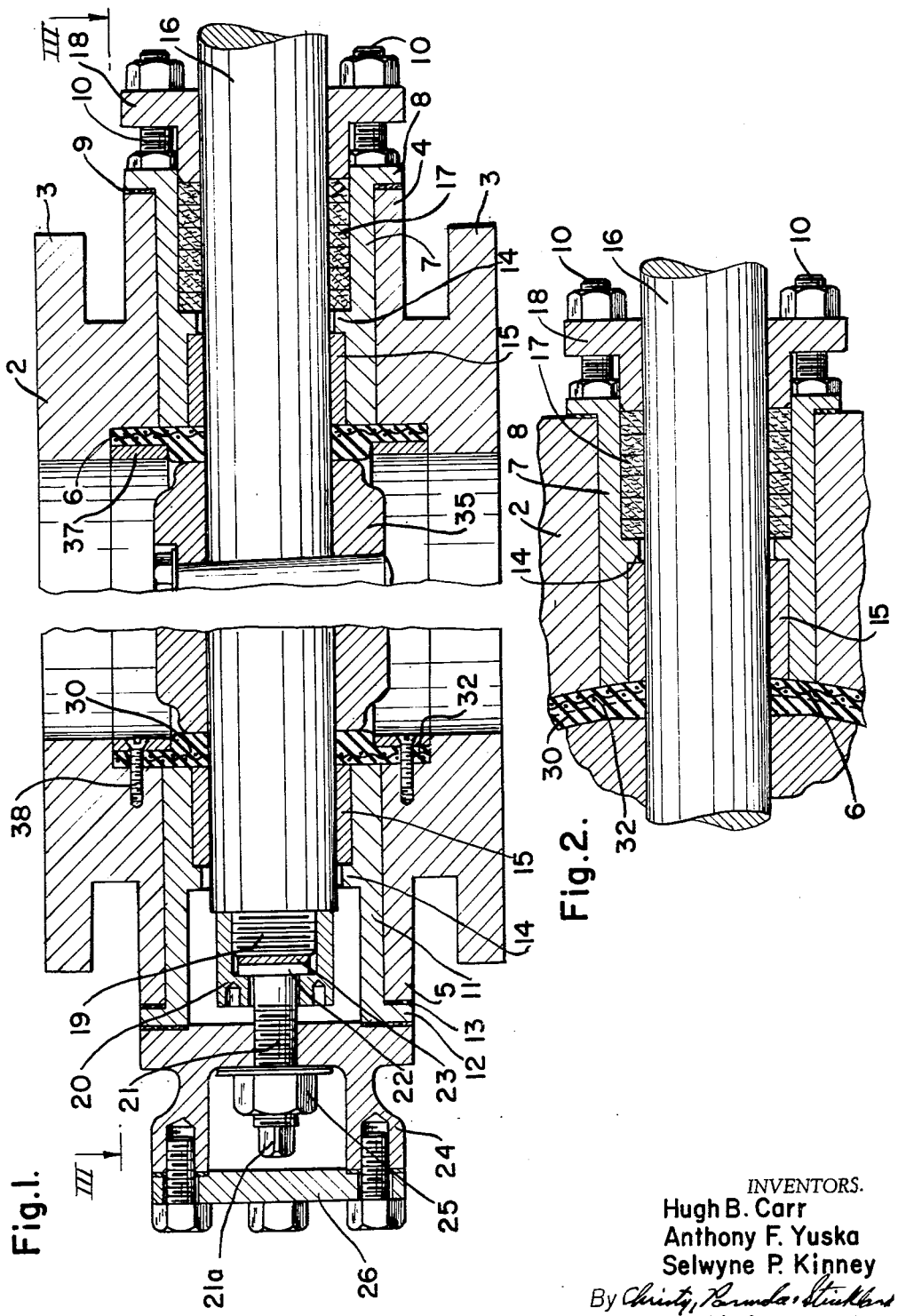
INVENTORS.
Hugh B. Carr
Anthony F. Yuska
Selwyne P. Kinney
By *Christy, Bromda Strickland*
his Attorneys.

Oct. 31, 1961  H. B. CARR ET AL  3,006,598
BUTTERFLY VALVE
Filed July 8, 1958  2 Sheets-Sheet 2

INVENTORS.
Hugh B. Carr
Anthony F. Yuska
Selwyne P. Kinney
By *Christy, Pannelas+Strickland*
his Attorneys.

United States Patent Office 3,006,598
Patented Oct. 31, 1961

3,006,598
BUTTERFLY VALVE
Hugh B. Carr and Anthony F. Yuska, Carnegie, and Selwyne P. Kinney, Crafton, Pa., assignors to S. P. Kinney Engineers, Inc., Carnegie, Pa., a corporation of Pennsylvania
Filed July 8, 1958, Ser. No. 747,134
4 Claims. (Cl. 251—171)

This invention is for an improvement in butterfly valves of the type designed for use in water works, industrial applications and other heavy valve applications, and it constitutes an improvement in rubber-seated valves of the type disclosed in application of Selwyne P. Kinney, Serial No. 723,703, filed March 25, 1958.

The present invention has for its principal objects to provide a butterfly valve which is effectively sealed against leakage, and which is susceptible of adjustment if leakage occurs, and to provide an improved valve construction which can be assembled with less labor than valves of this type as presently constructed. A further object of our invention is to provide a valve of this type in which valve shafts of different sizes may be selectively employed to meet the specifications established in the various applications for which the valve is intended.

These and other objects and advantages are secured by our invention which may be more fully understood by reference to the accompanying drawings, in which:

FIG. 1 is a transverse section through the valve with the center portion broken away;

FIG. 2 is a fragmentary section in a plane at right angles to FIG. 1 of one end only of the valve shaft and associated parts;

Figure 3:
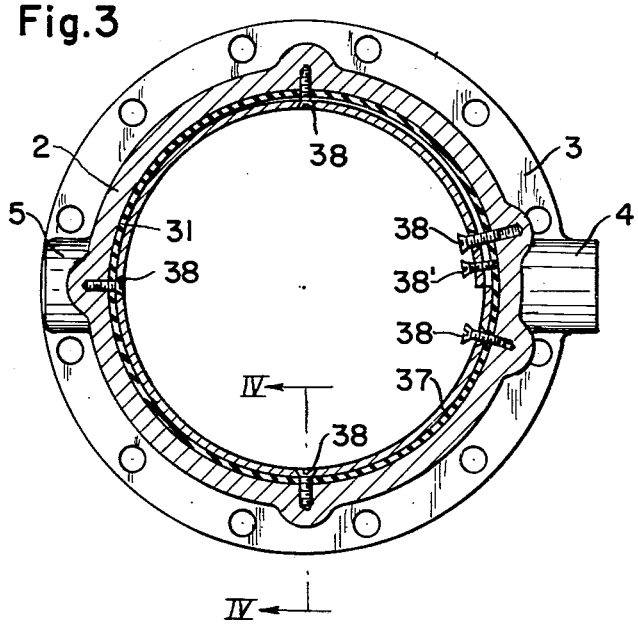
FIG. 3 is a transverse section on a smaller scale in the plane of line III—III of FIG. 1, showing the insertion of the rubber retaining ring.

The valve comprises a substantially cylindrical body 2 which is generally cast without end flanges, these being subsequently welded to the body, but they may be integral as indicated at 3 in FIG. 3. It is provided with diametrically opposed hubs 4 and 5 that project from the body midway between the ends, and which contain the bearings for the valve shaft. The interior of the body has a central recess 6 around its mid section. This recess holds the rubber seating ring hereinafter described.

Both of the bosses or hubs 4 and 5 are bored out to the same diameter. Fitted into the bore in hub 4 is a bushing 7 having a flange 8 at its outer end, the fit being a tight fit to prevent leakage around it. Between the end of the hub and the flange is a gasket 9. Bolts 10 serve to hold the bushing in place and hold the gasket against the end of the bushing.

In the opposite bushing 5 there is a similar bushing 11 having a flange 12 at its outer end, there being a gasket 13 between the flange and the end of the bushing, and this bushing is similarly held in place by bolts. Both bushings 7 and 11 extend radially into the recess and they are inserted before the recess 6 is machined, so that when the valve body is placed on a boring mill and the recess machined, the inner ends of the bushings are machined off at the same time, so that the contour of their inner ends conforms to and is flush with the wall of the recess 6. This can be best seen in FIG. 2.

Each bushing 7 and 11 has an internal flange 14 between its ends and a bearing sleeve 15 is received in each bushing between this flange and the inner end of the bushing. The valve shaft 16 extends diametrically of the valve body and is fitted into these bearings. One end of this shaft projects beyond the bushing 7 to provide an operating extension. A body of packing 17 is received in the bushing 7 around the shaft between the flange 14 and the outer end of the bushing, while a gland 18 fitted about the extending end of the shaft is entered into the outer end of the bushing to compress the packing.

The other end of the shaft has a threaded terminal 19 located within the outer end of the bushing. On this extension is a sleeve 20. An adjusting screw 21 has a head portion 22 received within the outer end of the sleeve 20, and interposed between the head portion and the end face of the shaft is a bearing disk 23.

An end cover 24 is bolted to the end face of the boss 5, and the adjusting screw 21 is threaded through the cover. The screw has an outer terminal 21a to which a wrench may be applied for turning it, and by turning this screw the shaft may be adjusted endwise within slight limits. A locking nut 25 holds the screw against accidental movement. A plate 26 may be bolted to the end of the cover 24 when the valve is installed for underground service, or in any other location where such protection is needed.

Figure 7:
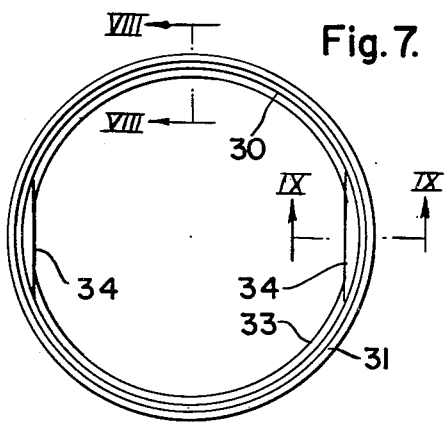
FIG. 7 is a front elevation of the rubber seating ring.
Figure 6:
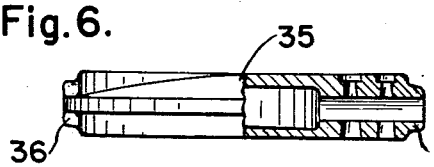
FIG. 6 is a view partly in elevation and partly in transverse section of the part shown in FIG. 5.
Figure 8:
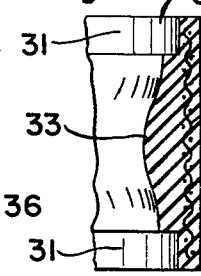
FIG. 8 is a transverse section on line VIII—VIII of FIG. 7, but on a larger scale.
Figure 9:
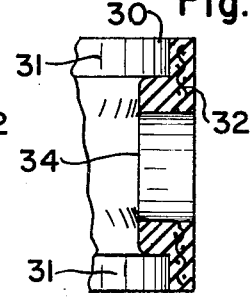
FIG. 9 is a similar section in the plane of line IX—IX of FIG. 7.

The rubber seating ring, designated generally as 30, may be made of natural rubber or so-called synthetic rubber, such as neoprene. When vulcanized, it is an integral annulus, having a flat outer face. On its inner face it has a thin edge portion 31 at each side, and a coarse wire mesh 32 is embedded in the body, extending crosswise of the band for substantially its full width. At its mid section it has a gently rounded ridge 33 rising from two flat lands or level areas between the ridge and the thin edge portion 31. This contour, best seen in FIG. 8, is uniform around the interior except at the places where the valve shaft 16 passes through it. At these points it has square flat areas 34 extending from the edge portion 31 on one side to the one on the other side as shown in FIGS. 7 and 9. The ring is made up by using first a layer of rubber, then a piece of wire, fabric, such as coarse mesh "hardware cloth," another layer of rubber, a narrow central band of rubber, and then a covering layer of rubber, as disclosed in the aforesaid Kinney application, the whole being then integrated by vulcanization.

Figure 4:
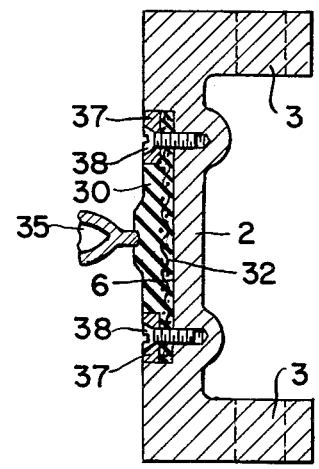
FIG. 4 is a typical section on a larger scale in the plane of line IV—IV of FIG. 3.
Figure 5:
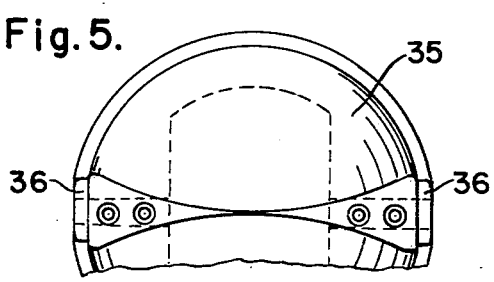
FIG. 5 is a plan view of the valve element or paddle, with a portion of the area broken away.

The valve or paddle, designated generally as 35, is a hollow casting of generally lenticular form, its two faces being convexed to accommodate the shaft, but afford a thin seating edge and foil-like surface when the valve is edgewise to the stream to streamline the liquid flow. It is here shown as a fully circular valve, except that it is squared at 36 at the two points where the shaft enters it, presenting square flat faces against the square portion 34 of the seating ring at all times. This construction of flat surfaces at diametrically opposite points is not only important in preventing leakage, but saves many hours of careful hand machining with a grinding tool which other paddles which are fully rounded require. The valve disk or paddle has an interior diameter only slightly less than the interior of the valve body so that as the valve moves to closed position, it rides up the slope of the ridge of the seating ring, crowding the rubber ahead of it as it approaches the fully closed position, the rubber springing up behind it so that a tight seal is made. This is clearly shown in FIG. 4.

The rubber seating ring is held in place by two stainless steel one-piece hoops or bands 37 which are split transversely at one point around the periphery. The seat itself, before being secured in the valve, is quite flexible notwithstanding the wire cloth band embedded in it, and can be easily distorted to insert it through one end of the valve body and then spread it smoothly into the recess 6, which is just wide enough to receive the seating band, and which may be first coated with rubber cement. When the ring has been inserted and smoothed into place, the hoops are contracted and forced axially into the valve body, one from each end. As soon as each ring is in position over the thin edges 31, it expands or is expanded until the two ends of the hoop snap into alignment. They are secured in place by screws 38 passing through the rings, through the thin rubber edges 31 of the seating ring into the valve body. Any force tending to move the rubber seating ring endwise puts the wire cloth in tension, so as to keep the ring in shape and prevent it from becoming dislodged. The rings protect the edges of the rubber from the fluid stream so that fluid cannot work in under the band.

After the valve is assembled, the thrust screw 21 is adjusted to equalize the pressure of the square areas of the valve disk against the square areas of the seating band. If leakage subsequently develops, the bushing 7 may be removed and a thinner gasket 9 substituted so as to enable the inner end of the bushing to press against the rubber seat, forcing it against the flat end of the valve disk. Gasket 13 may likewise be replaced.

Different industries specify different shaft diameters for valves of the same diameter. With the present invention bushings 7 and 11 may be used with internal bores to accommodate the correct shaft diameter, thus enabling one body size to be used with various shaft sizes.

The valve as herein described provides a rubber seated valve in which leakage is effectively overcome, in which the time required to insert and secure the seating ring in place is substantially reduced, and which substantially reduces the labor involved in machining the valve disk itself.

We claim:

1. A butterfly valve comprising a valve body having a circular passageway therethrough, a rotatable shaft passing through the body diametrically across the passageway, a circular valve disk on said shaft having a hub portion at each edge of the disk surounding the shaft, a rubber seating ring encircling the interior of the passageway in said body and with which the periphery of the disk makes sealing contact when the disk is rotated by the shaft to a closed position, the seating ring having diametrically opposite openings therethrough through which the shaft passes, the areas of the ring around said openings bearing at all times against the hub portions of the valve disk, the body having a bushing therein about the shaft at each side of the disk slidably fitted into the body for limited movement axially of the shaft, each bushing having its inner end bearing against the outer surface of that portion of the rubber seating ring that surrounds the shaft, each bushing having an internal rib intermediate its ends with a bearing sleeve fitted around the shaft and fitted inside the bushing with one end of the bearing sleeve contacting the rubber seating ring immediately surrounding the shaft and its outer end bearing against the internal rib of the bushing, the shaft terminating in the first of said two bushings and projecting entirely through and beyond the second of the two bushings, a closure over the outer end of the first bushing, means on said closure for adjusting the shaft in an axial direction relative to both bushings, a packing in the second bushing around the projecting shaft end, and a gland on the second bushing around the shaft for compressing the packing.

2. A butterfly valve as defined in claim 1 in which the bushings each have an outwardly-turned flange at its outer end, the portion of the body in which the outer end of each bushing is received being in the form of a radially-extending boss terminating in an end face, the flange at the outer end of each bushing extending over the end face of the boss in which it is received and being sealed thereto, there being removable gaskets between the flanges and the ends of the bosses whereby the pressure of the inner ends of the bushings against the rubber seat where said seat bears against the hub portions of the valve disk may be adjusted by changing the thickness of said gaskets.

3. A butterfly valve as defined in claim 1 in which the bushings each have an outwardly-turned flange at its outer end, the portion of the body in which the outer end of each bushing is received being in the form of a radially-extending boss terminating in an end face, the flange at the outer end of each bushing extending over the end face of the boss in which it is received and being sealed thereto, there being removable gaskets between the flanges and the ends of the bosses whereby the pressure of the inner ends of the bushings against the rubber seat where said seat bears against the hub portions of the valve disk may be adjusted by changing the thickness of said gaskets, the rubber seating ring being a continuous annulus having a central ridge portion and side flanges which are thinner than the ridge portion, the central ridge portion being of uniform thickness across the width of the annulus in the two areas which bear against the hub portion of the valve disk and elsewhere being thicker at the center and decreasing in thickness toward the side flanges, the valve body being annularly recessed to receive the seating ring, the central ridge portion of the seating ring protruding into the passageway through the valve to be contacted by the valve disk when the same is moved to closed position, and metal retaining rings in the recess at each side of the seat secured in position over the flange of the seating ring to retain said ring in place.

4. A butterfly valve as defined in claim 1 in which the bushings each have an outwardly-turned flange at its outer end, the portion of the body in which the outer end of each bushing is received being in the form of a radially-extending boss terminating in an end face, the flange at the outer end of each bushing extending over the end face of the boss in which it is received and being sealed thereto, there being removable gaskets between the flanges and the ends of the bosses whereby the pressure of the inner ends of the bushings against the rubber seat where said seat bears against the hub portions of the valve disk may be adjusted by changing the thickness of said gaskets, the rubber seating ring being a continuous annulus having a central ridge portion and side flanges which are thinner than the ridge portion, the central ridge portion being of uniform thickness across the width of the annulus in the two areas which bear against the hub portion of the valve disk and elsewhere being thicker at the center and decreasing in thickness toward the side flanges, the valve body being annularly recessed to receive the seating ring, the central ridge portion of the seating ring protruding into the passageway through the valve to be contacted by the valve disk when the same is moved to closed position, metal retaining rings in the recess at each side of the seat secured in position over the flanges of the seating ring to retain said ring in place, the inner ends of the bushings which contact the seating ring at the hub of the disk being curved to conform to the curvature of the annular recess in which the seating ring is received, the hub portions of the disk being tangentially and transversely flat where they contact the seating ring.

References Cited in the file of this patent

UNITED STATES PATENTS

| | | |
|---|---|---|
| 1,546,594 | McAulay | July 21, 1925 |
| 1,858,587 | Grant | May 17, 1932 |
| 1,990,309 | Phillips | Feb. 5, 1935 |
| 2,053,668 | Kinzie | Sept. 8, 1936 |
| 2,054,369 | Francis | Sept. 15, 1936 |
| 2,912,218 | Stillwagon | Nov. 10, 1959 |

FOREIGN PATENTS

| | | |
|---|---|---|
| 245,650 | Great Britain | of 1926 |
| 670,327 | Germany | of 1939 |
| 994,490 | France | of 1951 |
| 1,130,544 | France | of 1957 |